United States Patent
Arandia et al.

(10) Patent No.: US 10,839,113 B2
(45) Date of Patent: Nov. 17, 2020

(54) COMBINING FEATURE SELECTION AND SURROGATE MODELS FOR THE FORECAST OF MATERIAL CONCENTRATION IN FLUIDS

(71) Applicant: INTERNATIONAL BUSINESS MACHINES CORPORATION, Armonk, NY (US)

(72) Inventors: Ernesto Arandia, Dublin (IE); Sean A. McKenna, Blanchardstown (IE); Fearghal O'Donncha, Aran Islands (IE); Emanuele Ragnoli, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 819 days.

(21) Appl. No.: 15/599,692

(22) Filed: May 19, 2017

(65) Prior Publication Data
US 2018/0336298 A1 Nov. 22, 2018

(51) Int. Cl.
G06F 30/20 (2020.01)
G06F 111/10 (2020.01)

(52) U.S. Cl.
CPC .......... *G06F 30/20* (2020.01); *G06F 2111/10* (2020.01)

(58) Field of Classification Search
CPC .............................. G06F 30/20; G06F 2111/10
See application file for complete search history.

(56) References Cited

U.S. PATENT DOCUMENTS 9,206,680 B2   12/2015  Ashby et al.
2010/0002925 A1*  1/2010  Kiraly .................... G06K 9/342
                                                           382/131
2011/0308790 A1  12/2011  Strapoc et al.

FOREIGN PATENT DOCUMENTS

CN           105893654 A       8/2016

OTHER PUBLICATIONS

Bergh, Luis G., and David Gómez. "On line monitoring and diagnosis of the operation of a hybrid CSTR by using PCA models." Computer Aided Chemical Engineering. vol. 27. Elsevier, 2009. 1203-1208.*
Anonymous, "Use of Ziegler-Natta Catalysts Made From Magnesium Mixed Metal Precursors," An IP.com Prior Art Database Technical Disclosure, IP.com No. IPCOM000197587D, Jul. 15, 2010 (5 pages).
"Development of a Refinery/Petrochemical Master Plan," An IP.com Prior Art Database Technical Disclosure, IP.com No. IPCOM000217611D, May 8, 2012 (25 pages).
Anonymous, "On the Scale-Up and Power Consumption Requirements in the Mixing of Cementitious Fluids—A Theoretical Consideration," An IP.com Prior Art Database Technical Disclosure, IP.com No. IPCOM000234015D, Jan. 7, 2014 (13 pages).
Dotse, "Mixing Analysis in a Stirred Tank Using Computational Fluid Dynamics," University of Ghana, Jul. 2016 (96 pages).

* cited by examiner

*Primary Examiner* — Saif A Alhija
(74) *Attorney, Agent, or Firm* — Griffiths & Seaton PLLC

(57) ABSTRACT

Embodiments for intelligent forecasting of material concentrations in a fluid by a processor in a computing environment. A material concentration of a material in a fluid may be predicted according to one or more continuous stirred tank reactor (CSTR) surrogate models on statistical flow trajectories of the fluid defined by a principle component analysis (PCA) operation of a system.

12 Claims, 8 Drawing Sheets

US 10,839,113 B2

COMBINING FEATURE SELECTION AND SURROGATE MODELS FOR THE FORECAST OF MATERIAL CONCENTRATION IN FLUIDS

BACKGROUND OF THE INVENTION

Field of the Invention

The present invention relates in general to forecasting material concentrations in fluids using a computing system, and more particularly to, various embodiments combining feature selection and surrogate models for the forecast of material concentration in fluids by a processor in a computing environment.

Description of the Related Art

In today's interconnected and complex society, computers and computer-driven equipment are more commonplace. Processing devices, with the advent and further miniaturization of integrated circuits, have made it possible to be integrated into a wide variety of devices. Accordingly, the use of computers, network appliances, and similar data processing devices continue to proliferate throughout society, particularly in the physical sciences such as, for example, fluid mechanics.

SUMMARY OF THE INVENTION

Various embodiments for intelligent forecasting of material concentrations in a fluid by a processor in a computing environment, are provided. In one embodiment, by way of example only, a method for intelligent forecasting of material concentrations in a fluid, again by a processor, is provided. A material concentration of a material in a fluid may be predicted according to one or more continuous stirred tank reactor (CSTR) surrogate models on statistical flow trajectories of the fluid defined by a principle component analysis (PCA) operation of a system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
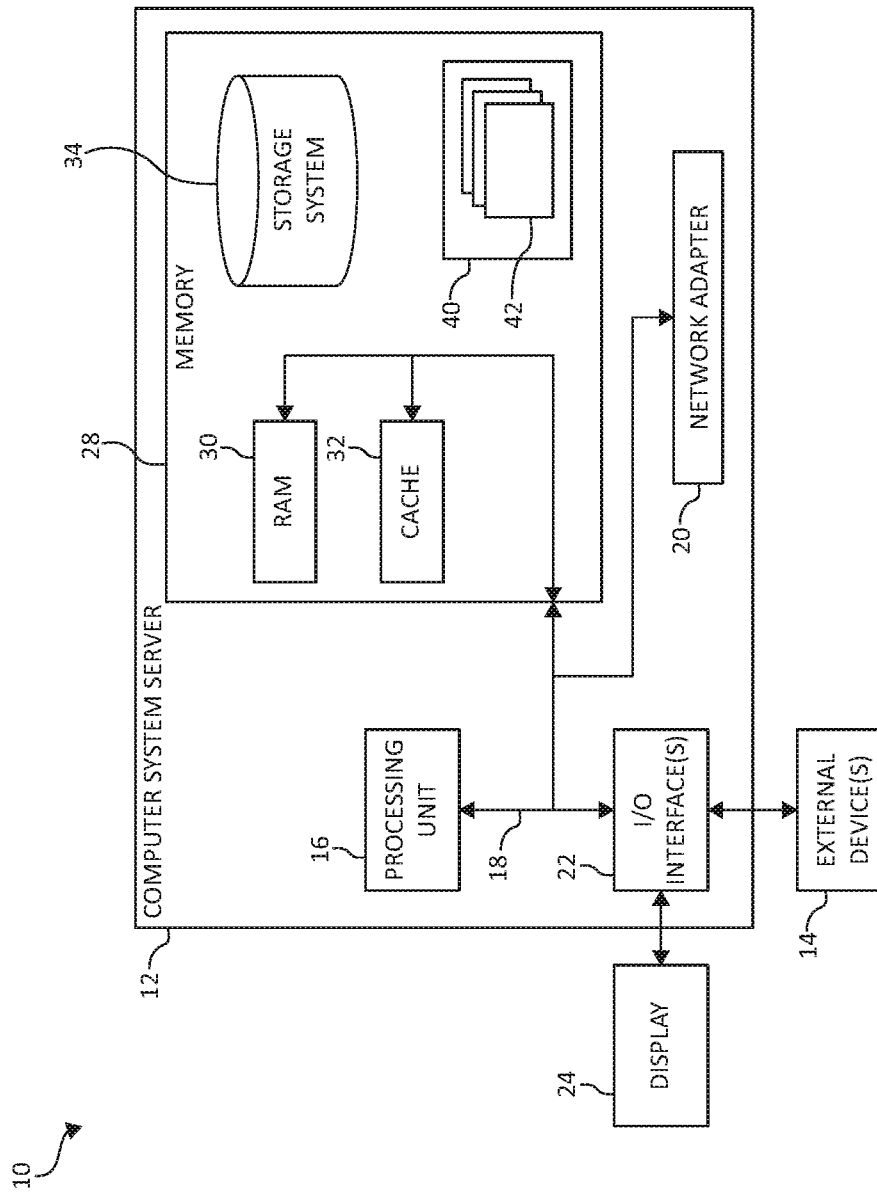
FIG. 1 is a block diagram depicting an exemplary computing node according to an embodiment of the present invention.

As computing systems continue to increase in technological advancement, the demand for sophisticated prediction, forecasting, and modeling of various services also grows. Many industries such as, for example, the physical sciences, rely on critical information for forecasting and prediction. For example, fluid mechanics is the study of the mechanics of fluids (e.g., liquids, gases, and plasmas) and the forces upon them. Fluid mechanics may include the fluid dynamics that describe the flow of fluids. Convection may be the movement of a fluid and advection may be the movement of some material dissolved or suspended in the fluid. Advection may also be the transport of a substance by bulk motion or the movement of some quantity via the bulk flow of a fluid. During advection, a fluid may transport some conserved quantity or material via bulk motion. The fluid's motion may be described mathematically as a field vector and the transported material may be described by a scalar field showing its distribution over space. Diffusion may be a net movement of molecules or atoms from a region of high concentration to a region of low concentration. Fluid dynamics may apply to a wide range of applications. Because fluids may be transported or be in motion, many fluid flow models may be used for sophisticated prediction, forecasting, and modeling of various services.

Thus, the present invention provides for intelligent forecasting of material concentrations in a fluid by a processor in a computing environment. The present invention provides for surrogate modeling of advection-diffusion processes (e.g., transport of substances within chemical reactors and transport of pollutants within freshwater), such as for weather or oceanic conditions, for predicting material densities in fluids. Prediction of the advection-diffusion of a fluid body may be performed using an advection-diffusion model of high resolution. Accurate long-term predictions of material densities may be obtained from an advection-diffusion model output without the drawback of requiring long simulation periods of days to weeks (e.g., environmental risk assessment).

However, given that the computation of the uncertainty in material densities requires a large number of simulations, which render the computational cost of advection-diffusion models prohibitive, the present invention provides for using surrogate models that mimic the behavior of advection-diffusion models while increasing computing efficiency such as, for example, by reducing computational times. In one aspect, one or more surrogate model configurations may be developed for a selected space containing the fluid.

In an additional aspect, material concentration of a material in a fluid may be predicted according to one or more continuous stirred tank reactor (CSTR) surrogate models on statistical flow trajectories of the fluid defined by a principle component analysis (PCA) operation of a system. In one aspect, the mechanisms of the illustrated embodiments provide for the setup of surrogate models, using CSTRs on statistical flow trajectories of the fluid defined by a principal component analysis (PCA) of a physical system, in order to predict material concentrations in fluids. One or more CSTR surrogate models and PCA analysis may be used to predict, with low computational complexity, material concentrations in fluids. The CSTR surrogate models may be parameterized via the PCA analysis of a physical model to predict concentrations in fluids. The CSTR surrogate models may be dynamically configured via PCA analysis of a physical model to predict.

In one aspect, a PCA operation may be a statistical procedure that uses an orthogonal transformation to convert a set of observations of possibly correlated flow trajectories into a set of values of linearly uncorrelated variables called principal components ("PC") (or principal modes of variation). That is, a principal component may be a linearly uncorrelated variable that represents a flow trajectory following transformation through the PCA process. The number of PCs may be less than or equal to the smaller of the number of original flow trajectories observed in the output of the advection-diffusion physical model. This transformation is defined in such a way that the first PC may have a largest possible variance (that is, accounts for as much of the variability in the data as possible), and each succeeding component in turn has the largest variance possible under the constraint that it is orthogonal to the preceding components. The resulting vectors may be an uncorrelated orthogonal basis set. PCA may also be sensitive to the relative scaling of the original variables (flow trajectories).

Other examples of various aspects of the illustrated embodiments, and corresponding benefits, will be described further herein.

It is understood in advance that although this disclosure includes a detailed description on a computing system, the computing system may be a cloud computing system, and the implementation of the teachings recited herein are not limited to a cloud computing environment or Internet of Things (IoT) network environment. Rather, embodiments of the present invention are capable of being implemented in conjunction with any other type of computing environment now known or later developed. It should be noted that the IoT is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud computing environment. The control system may include an end-to-end flow monitoring mechanism similar to the one described herein.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
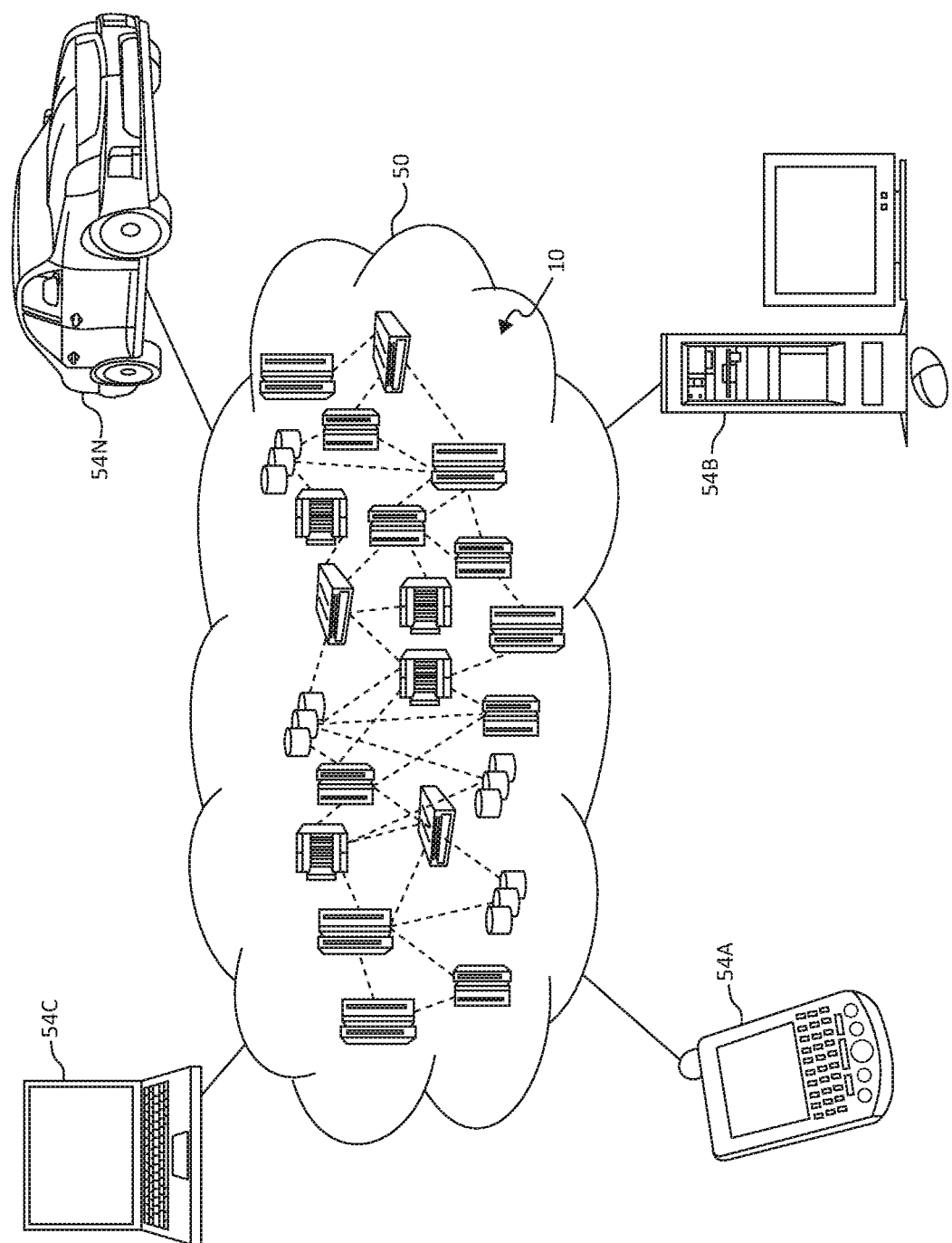
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
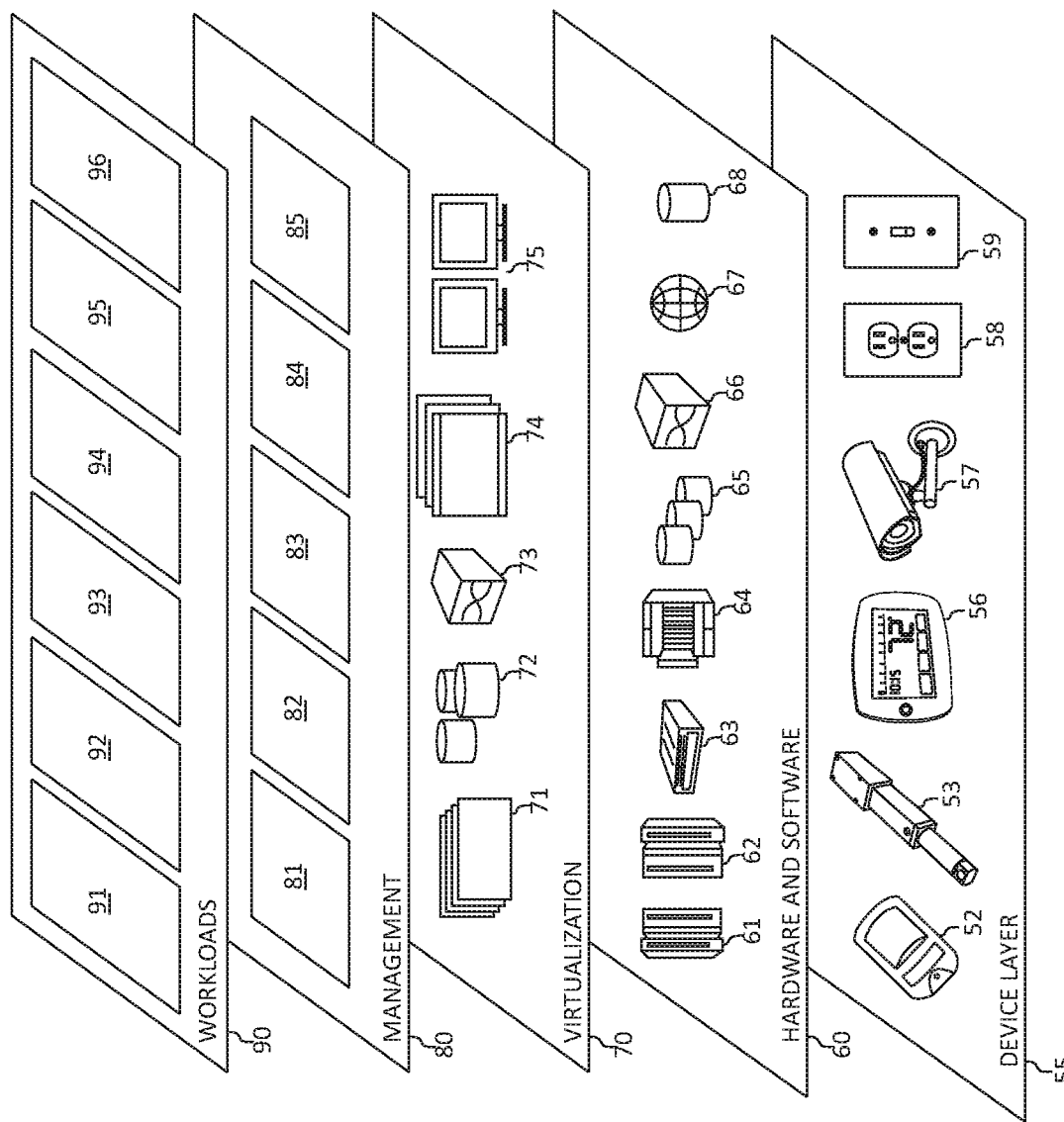
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices for intelligent forecasting of material concentrations in fluids (e.g., combining feature selection and surrogate models for the forecast of material concentrations in fluids) workloads and functions 96. In addition, configuring settings for various computer-controlled devices using workloads and functions 96 for intelligent forecasting of material concentrations in fluids may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for intelligent forecasting of material concentrations in fluids may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
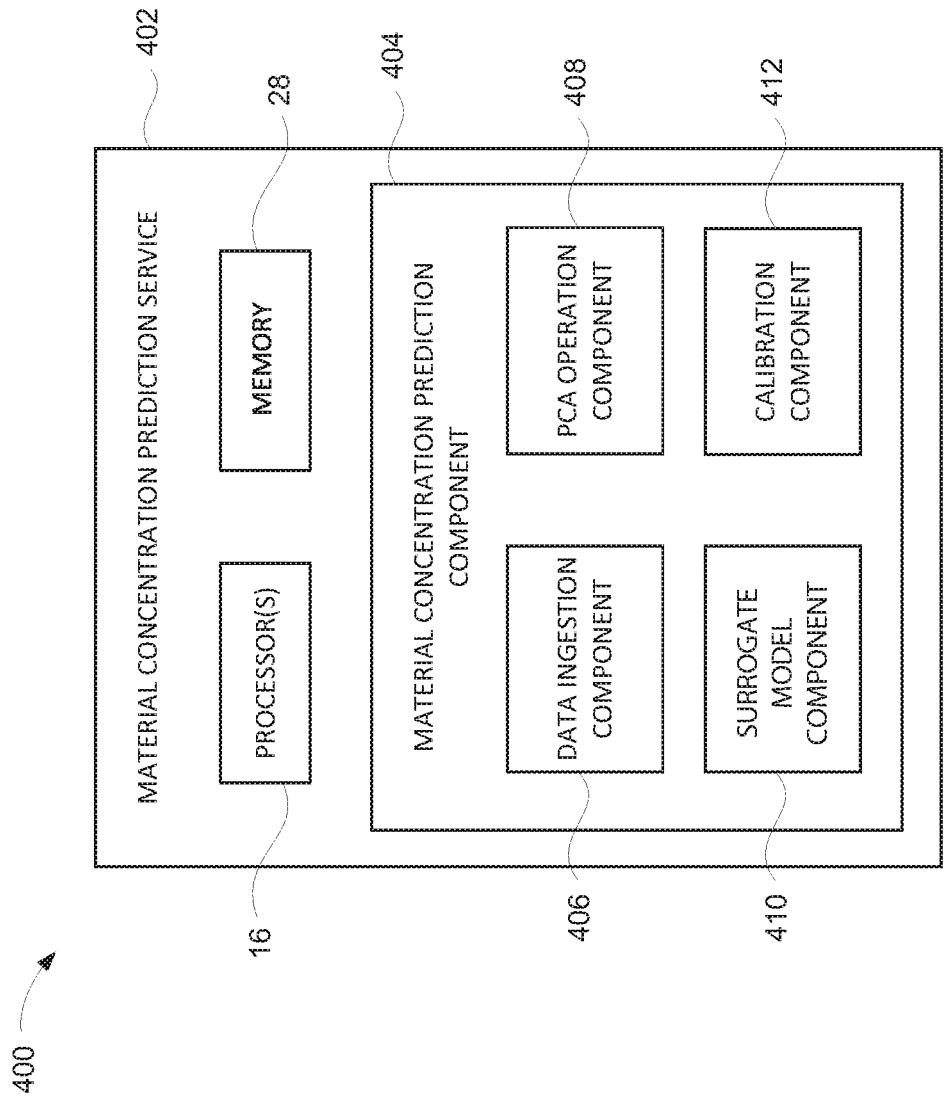
FIG. 4 is an additional block diagram depicting various user hardware and cloud computing components functioning in accordance with aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4. For example, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16, a system memory 28, and a bus 18 of FIG. 1 (not shown in FIG. 4 for illustrative purposes only) that couples various system components including system memory 28 to processor 16.

The computer system/server 12 of FIG. 1 may include a material concentration prediction service 402 for intelligent forecasting of material concentrations in fluid within a computing environment such as, for example, a cloud computing environment, along with other related components.

The material concentration prediction service 402 may include a material concentration prediction component 404 and, again, processing units 16 and a system memory 28. In operation, the material concentration prediction component 404 may establish a 3-way communication pattern between one or more data sources (e.g., an application, database, webpage, etc.) and one or more continuous stirred tank reactors (CSTR) to enable communication flow between the data sources and one or more CSTRs. The material concentration prediction component 404 may include a data ingestion component 406, a principle component analysis (PCA) operation component 408 (e.g., proper orthogonal decomposition), a surrogate modeling component 410, and a calibration component 412. In one aspect, the data ingestion component 406 may be a physical-data ingestion component that may process data inputs (physical data inputs) from an advection-diffusion (AD) model (e.g., a high-resolution AD model) of a fluid. It should be noted that a physical input may be data inputs in the form of flow velocities and material (solute or substance in the fluid) concentrations. These physical inputs may result from simulations performed by the AD model. High resolution may refer to the spatial resolution of the three-dimensional mesh that represents the real fluid body. A high resolution mesh consists of cells that are relatively small depending on the fluid represented. For the embodiment example, a high resolution mesh may consist of 50×50 meter cells in the horizontal and 40 layers of variable height in the vertical (average height of less than 1 meter). The mesh could be much finer in the horizontal for applications in reactor modeling.

The PCA operation component 408 may be a reduced space modeling component that may perform a PCA operation on the physical inputs. The PCA operation component 408 may parameterize one or more surrogate models (SM) (e.g., CSTR surrogate models) using the various physical inputs. That is, the PCA operation component 408 may parameterize one or more CSTR surrogate models via the PCA analysis operation of a physical model to predict the material concentration of a material in a fluid.

The surrogate modeling component 410 may determine and/or compute material densities in a fluid over a selected period of time according to various and different alternative arrays of CSTR systems that may be connected in series and/or associated with each principal component. The surrogate modeling component 410 may dynamically configure one or more CSTR surrogate models via a PCA analysis operation of a physical model to predict the material concentration of a material in a fluid.

The calibration component 412 may adjust one or more parameters of the PCA operation component 408 based on an output of the AD model.

Thus, the material concentration prediction service 402 may provide significant reductions in time required to predict material densities with respect to one or more AD model simulations. The material concentration prediction service 402 increases the accuracy of the predicting and forecasting material concentrations in a fluid. The material concentration prediction service 402 is flexible by enabling a user or administrator to adjust or manipulate a size of feature space (e.g., a space containing a fluid) to accurately resolve complex flows of the fluid in the reduced space.

Figure 5:
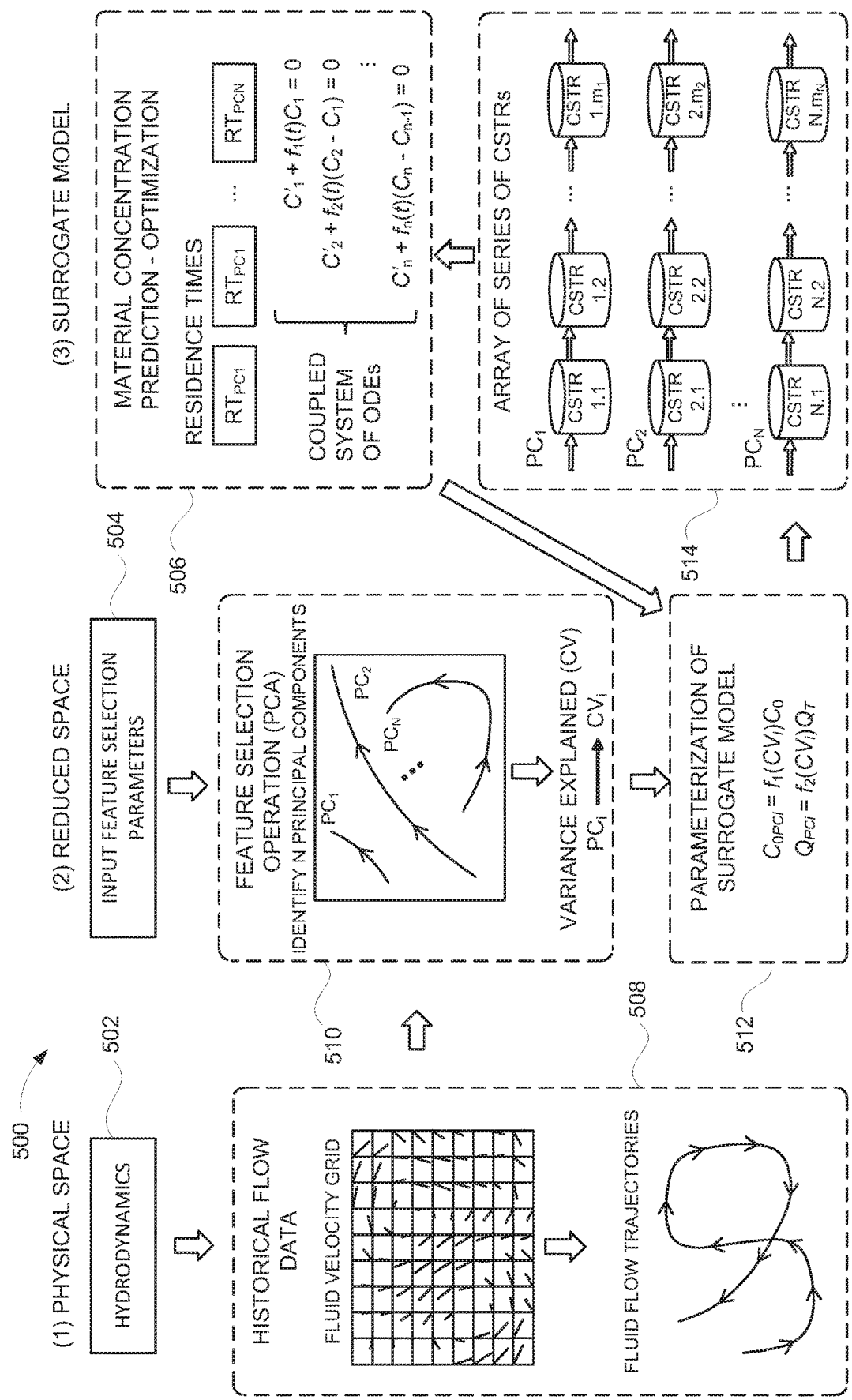
FIG. 5 is an additional block diagram depicting intelligent forecasting of material concentrations in a fluid in accordance with aspects of the present invention.

Turning now to FIG. 5, a block diagram of exemplary functionality 500 relating to intelligent forecasting of material concentrations in a fluid is depicted. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for intelligent forecasting of material concentrations in a fluid in a cloud-computing environment in accordance with the present invention, such as those described in FIGS. 1-4. Many of the functional blocks 500 may execute as background processes on various components, either in distributed computing components, or on the user device, or elsewhere.

Starting with block 502, a physical model 502, such as an advection-diffusion (AD) model, is shown. In the Physical Space Module (1), a real fluid system may be represented by means of a high-resolution advection-diffusion model (physical model) 502. This physical model may simulate the hydrodynamics within the fluid and calculate flow trajectories and material concentrations within the fluid. The physical model output (not the model itself) may be the element of concern or interest. Historical advection-diffusion (AD) data source (physical module) may be used and defined. As shown in block 508, historical AD data (e.g., historical flow data) may be retrieved. The AD historical data may be processed statistically (e.g., compute depth averages). Using a fluid velocity grid, one or more AD fluid flow trajectories may be identified. Also, one or more physical properties of the system (geometric model, grid discretization, boundary and initial conditions) may be analyzed.

As indicated in block 504, one or more feature selection parameters may be input for a PCA operation. The input parameters (e.g., user provided input parameters) may be processed and analyzed so as to determine and/or identify 1) a maximum number of principal components (PCs) (e.g., N number of PCs such as, for example, $PC_1$, $PC_2$, and $PC_n$, where N is a positive integer or selected number), 2) a maximum number of CSTRs per PC, and 3) convergence criteria. A transformations operation may be performed to convert flow trajectories into PCs. Also, one or more surrogate model parameters may be defined.

The historical flow data 508 produced by the physical model may be used as input to a reduced space module (2), where a feature selection operation may identify the fluid's dominant advection-diffusion characteristics using principal component analysis (PCA), as indicated in blocks 504, 510, and 512. The feature selection operation may calculate the portion of the flow variability explained by each principal component (e.g., $PC_1$, $PC_2$, and $PC_N$) and assigns these variances as a coefficient $CV_i$ to each component, where $CV_i$ is the variance and $C_0$ is the initial concentration of material. The module distributes the initial concentration of the material ($C_0$) of interest and the total flow through the fluid system based on nonlinear functions $f_1$ and $f_2$ of the coefficients of variance $CV_i$. A variance explained (CV) may be provided for each PC such as, for example, PCi for CVi, where "i" is a variable or positive integer.

In the Surrogate Model Module (3), one or more surrogate models, as illustrated in block 506, may be built consisting of a series of CSTRs, as shown collectively in block 514, assigned to each PCA trajectory, identified in 510, where the number of CSTRs $m_i$ may be variable. In association with block 506, block 514 may include one or more CSTR arrays (which may be connected in series) associated with one or more PCs. For example, $PC_1$ may be associated with CSTR 1.1, 1.2, and $1.m_1$. $PC_2$ may be associated with CSTR 2.1, 2.2, and $2.m_2$. $PC_N$ may be associated with CSTR N.1, N.2, and $N.m_N$. Also, one or more surrogate models may determine or predict the material densities over a selected time period such as, for example, over residence time (RT) time periods for each one of the various and alternative configurations of the CSTRs connected, which may be connected in series and associated with each principle component (PC).

A coupled system of differential equations, as illustrated in block 506, may be assigned to each CSTR series and solved to determine the concentration and residence time of material through each PCA trajectory, such as, for example, the coupled system of differential equations of:

$$C_1' + f_1(t)C_1 = 0,$$

$$C_2' + f_2(t)(C_2 - C_1) = 0, \ldots \text{ and}$$

$$C_n' + f_n(t)(C_n - C_{n-1}) = 0$$

where C is the initial concentration of the material in the fluid and t is time. The parameters of the $f_1$ and $f_2$ functions, as well as the number of CSTRs, and additional parameters to describe the CSTR-based surrogate model are calibrated iteratively using an optimization algorithm.

As depicted in block 512, one or more CSTR surrogate models may be parameterized using the PCA operation of a physical model of the system for the predicting. That is, block 512 illustrates a parameterization of the surrogate model and estimates initial material concentrations and total flows for each principal component. These flows are necessary as input to the CSTR based surrogate model of block 514. In one aspect, the parameterization of the surrogate model and estimates may be performed using equations:

$$C_{0PCi} = f_1(CV_i)C_0, \quad (1), \text{ and}$$

$$Q_{PCi} = f_2(CV_i)Q_T, \quad (2)$$

where $C_{0PCi}$ is the initial material concentration assigned to principal component i (i=1, ..., N), $f_1(CV_i)$ is a nonlinear function of the coefficient of variance explained $CV_i$, $C_0$ is the initial average concentration of the material in the whole fluid body, $Q_{PCi}$ is the inflow rate of fluid allocated to principal component i, $f_2(CV_i)$ is another nonlinear function of $CV_i$, and $Q_T$ is the total inflow rate of fluid provided to the fluid system. Parameterization focuses on calibrating the parameters of the nonlinear functions $f_1$ and $f_2$ starting from arbitrary initial values that are tuned iteratively using the processes of blocks 506, 512, and 514.

Figure 6:
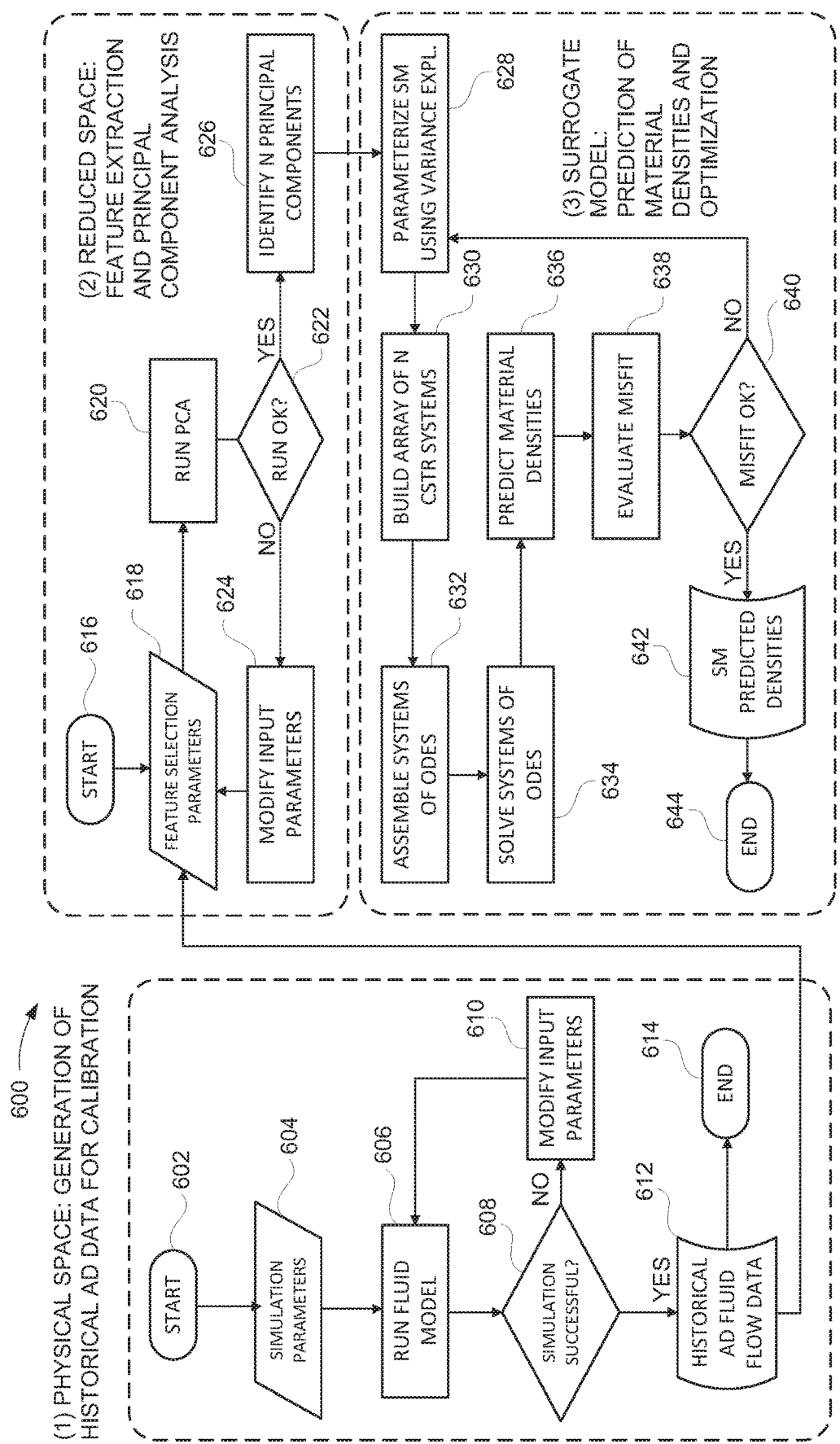
FIG. 6 is a flowchart diagram depicting an exemplary method for intelligent forecasting of material concentrations in fluids by a processor within a cloud computing environment in which various aspects of the present invention may be realized.

Turning now to FIG. 6, a method 600 for intelligent forecasting of material concentrations in fluids by a processor within a cloud computing environment is depicted. In one aspect, each of the devices, components, modules, operations, and/or functions described in FIGS. 1-5 also may apply or perform one or more operations or actions of FIG. 6. The functionality 600 may be implemented as a method executed as instructions on a machine, where the instructions are included on at least one computer readable medium or one non-transitory machine readable storage medium. The functionality 600 may start in block 602, for a physical space (e.g., generation of historical AD data for calibration). One or more simulation parameters may be collected, processed, and/or analyzed, as in block 604. One or more various fluid models may be performed on the simulation parameters, as in block 606. A determination operation may be performed to determine the success of the simulation, as in block 608. If yes at block 608, the functionality 600 may move to block 612 and provide the historical AD fluid flow data, and then end at block 614. If no at block 608, the input parameters may be modified, as in block 610, where the functionality may then return to block 606.

Starting in block 616, the historical AD fluid flow data (from block 612) may be retrieved and used for feature selection parameters, as in block 618. A PCA operation may be performed, as in block 620. A determination operation may be performed to determine the success of the PCA operation, as in block 622. If no at block 622, the input parameters may be modified, as in block 624, where the functionality may then return to block 618. If yes at block 622, the functionality 600 may move to block 626 and identify N number of principal components (PC). From block 626, the functionality may move to block 628 where one or more surrogate models may be parametrized using the PCA operation (e.g., variance explanation) of a physical model of the system for the predicting. One or more arrays of N CSTR systems may be organized and/or built, as in block 630. A system of ODEs may be assembled, as in block 632. The system of ODEs may be determined and/or calculated, as in block 634. The material concentration of a material in a fluid may be predicted, as in block 636. One or more the surrogate models may be evaluated to identify erroneous surrogate models so as to dynamically configure the one or more surrogate models according to the PCA operation of the system for the predicting, as in block 638. A determination operation may be performed, at block 640, to determine if the identified erroneous surrogate models required no configurations. If no at block 640, the functionality may move to block 628. If yes at block 640, the one or more surrogate models may predict the material densities, as in block 642. The functionality 600 may end at block 644.

Figure 7:
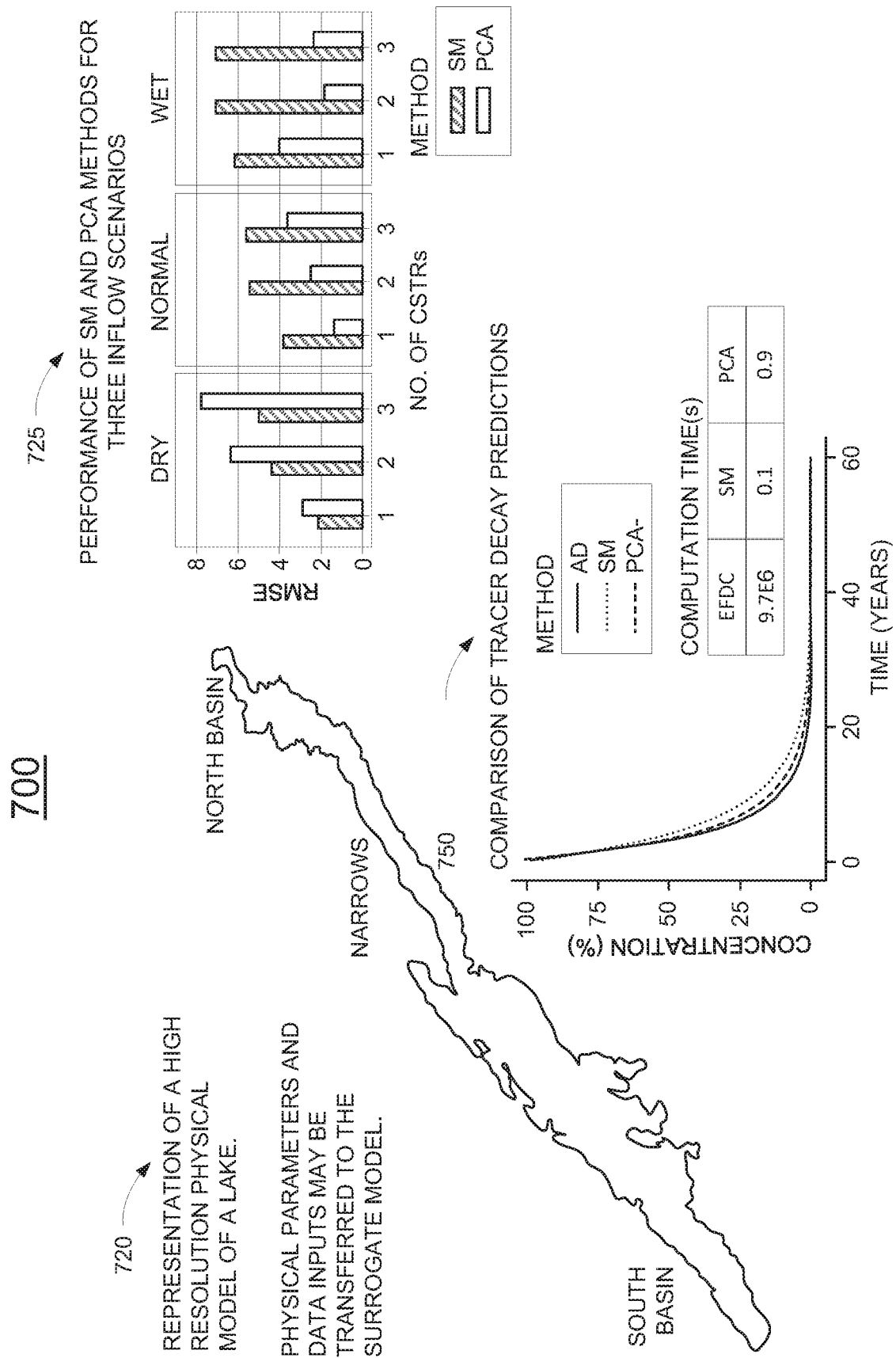
FIG. 7 is a block/flow diagram depicting intelligent forecasting of material concentrations in a fluid in accordance with aspects of the present invention.

FIG. 7 is a chart diagram 700 for intelligent forecasting of material concentrations in fluids. More specifically, FIG. 7 summarizes a preliminary use case assessment and comparison on the predictive accuracy of the proposed invention in predicting the long-term decay of salt, represented as a conservative tracer. The goal of this assessment is to illustrate the benefits of the present invention (PCA and surrogate model) compared to a surrogate model (SM) based on a single series of CSTRs (as opposed to the dynamically adjusted series of CSTRs for each principal component of the present invention).

Diagram 720 of FIG. 7 presents a graphical representation of the high-resolution AD model of the fluid body (in this case a body of water such as a lake). Said differently, the chart diagram includes the high resolution physical model of the body of water 720 (e.g., a lake having a north basin region, a narrows region, and a south basin region). The physical parameters and data inputs may be transferred to a surrogate model. Three benchmark simulations were performed using the AD model: (1) under DRY conditions, the detailed total inflows to the lake in the form of runoff and direct precipitation were decreased by 20% with respect to normally observed values; (2) under NORMAL conditions, the observed detailed inflows were applied; and (3) under WET conditions, the observed normal inflows were increased by 20% with respect to the observed inflows. Each simulation took approximately 9.7 E6 seconds to run as indicated in the table/graph 750. The results of the simulations in the form of flow trajectories and tracer concentrations were stored to be used as input for the PCA and surrogate model (e.g., PCA-SM) based aspects of the present invention.

The chart diagram 700 depicts graph 725 presenting a graphical summary of the prediction accuracy assessment of a simple surrogate model (SM) and our invention (PCA) with respect to the benchmark simulation results. Chart 725 depicts showing the performance of the surrogate models and PCA operations for three inflow fluid scenarios such as, for example, dry, normal, and/or wet as defined or selected based on conditions for a selected region, with the root mean squared error (RMSE) on the y-axis and the number (No.) of CSTRs and methods on the X-axis of graph 725. The graph 725 depicts a performance comparison of the surrogate models (SM) and the PCA model (e.g., PCA-SM) for normal and extreme wet/dry conditions (+/−20%) lake inflow scenarios. The PCA-SM model methods use 3 PCAs which account for 89% of the flow variance.

Said differently, graph 725 illustrates for each simulation scenario (dry, normal, and wet), in the vertical axis, the root mean squared error (RMSE) of the SM and PCA operations with respect to the benchmarks and, in the horizontal axis, the number of CSTRs assigned to SM and PCA. To clarify, 1 to 3 CSTRs were assigned to each SM and PCA model, which means that the SM model consists of a single series of 1 to 3 CSTRs. The present invention PCA (e.g., PCA-SM model) assigns 1 to 3 CSTRs to each principal component. The PCA method (e.g., PCA-SM model) of the present invention outperforms (smaller RMSE) the SM method except for the dry scenario. This means (1) these results relied on a preliminary implementation of the dynamic calibration process, so further tuning may lead to outperforming the SM also for the dry scenario; and (2) the dry and wet scenarios are somewhat unrealistic since they are extreme considering the historical trends on precipitation; thus more weight may be placed on the results obtained for the normal scenario.

The chart diagram 700 also depicts graph 750 illustrating a comparison of dye decay predictions. Graph 750 illustrates long term tracer decay predictions by the AD model (e.g., environmental fluid dynamics code "EFDC"), the PCA (e.g., PCA-SM) of the embodiments described herein, and the surrogate model (SM) for the normal inflow simulation scenario. Better agreement is observed between PCA and EFDC. The simulation time by PCA (e.g., PCA-SM) is slightly larger than that of SM, but still small enough to reduce the AD model times by 7 orders of magnitude.

The computation times of the EFDC shows 9.7 E6 seconds, the surrogate model as 0.1, and the PCA as 0.9 over a selected period of time, where time (e.g., years) is depicted on the X-axis and the percentage of concentration of the material in a fluid is depicted on the Y-axis. Chart 750 shows a 60-year simulation period between the PCA predictions and a baseline AD (e.g., environmental fluid dynamics code "EFDC") data. The computational time for the EFDC is shown as 16 weeks and the required time for the SM is one or more orders of smaller magnitude.

Figure 8:
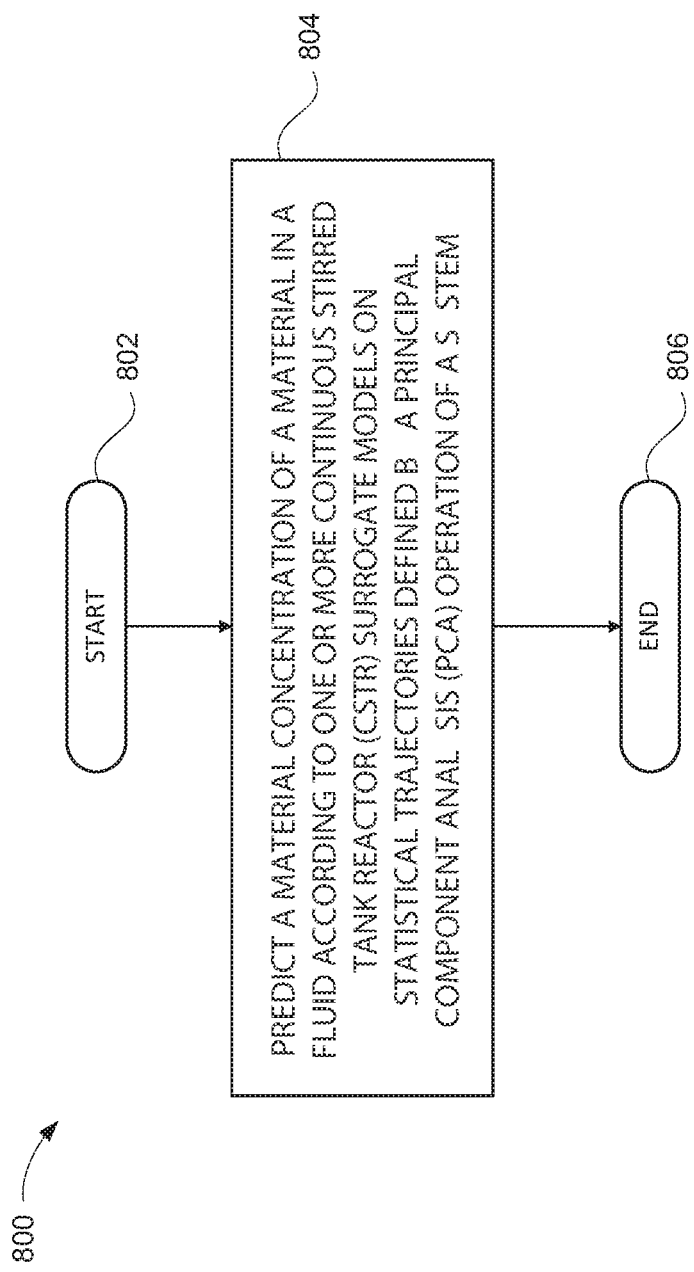
FIG. 8 is a flowchart diagram depicting an exemplary method for intelligent forecasting of material concentrations in a fluid in a computing environment, again in which various aspects of the present invention may be realized.

Turning now to FIG. 8, a method 800 for intelligent forecasting of material concentrations in fluids by a processor within a cloud computing environment is depicted. In one aspect, each of the devices, components, modules, operations, and/or functions described in FIGS. 1-7 also may apply or perform one or more operations or actions of FIG. 8. The functionality 800 may be implemented as a method executed as instructions on a machine, where the instructions are included on at least one computer readable medium or one non-transitory machine readable storage medium. The functionality 800 may start in block 802. A material concentration of a material in a fluid may be predicted according to one or more continuous stirred tank reactor (CSTR) surrogate models on statistical flow trajectories of the fluid defined by a principle component analysis (PCA) operation of a system, as in block 804. The functionality 800 may end, as in block 806.

In one aspect, in conjunction with and/or as part of at least one block of FIG. 8, the operations of method 800 may include each of the following. The operations of method 800 may predict low computational complexity material concentrations in the fluid using the one or more CSTR surrogate models and the PCA operation. One or more CSTR surrogate models may be parameterized using the PCA operation of a physical model of the system for the predicting.

The operations of method 800 may dynamically configure the one or more CSTR surrogate models according to the PCA operation of the system for the predicting, wherein the system is one or more CSTR systems connected in series. One or more features and parameters may be selected from historical flow data of the material. The operations of method 800 may analyze and process input data from an advection-diffusion (AD) model of the fluid.

The PCA operation may also include at least analyzing one or more input parameters so as to determine a maximum number of material components, a maximum number of CSTR systems per each one of the material components, and criteria for convergence; converting material flow trajectories into each one of the material components; and/or defining one or more parameters for the CSTR surrogate models.

The operations of method 800 may calibrate the one or more CSTR surrogate models by adjusting one or more parameters of the PCA operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent forecasting of material concentrations in a fluid by a processor within a cloud computing environment, comprising:
   receiving and processing input data from an advection-diffusion (AD) model of a fluid;
   selecting one or more features and parameters from historical flow data of a material in the fluid as input for a principle component analysis (PCA) operation of a system, wherein the historical flow data is part of the input data received from the AD model;
   performing the PCA operation according to the one or more features and parameters selected as input, wherein the PCA operation includes:
      utilizing the one or more features and parameters to determine a maximum number of principal components (PCs), a maximum number of continuous stirred tank reactor (CSTR) systems per each one of the PCs, and criteria for convergence, and
      performing a transformation operation to convert material flow trajectories of the AD model into each one of the PCs;
   generating one or more CSTR surrogate models according to an output of the PCA operation, wherein the PCs of the PCA operation define one or more input parameters for the CSTR surrogate models; and
   predicting a material concentration of the material in the fluid according to an analyzation of the one or more continuous CSTR surrogate models on statistical flow trajectories of the fluid defined by the PCA operation of the system.

2. The method of claim 1, further including parameterizing the one or more CSTR surrogate models using the PCA operation of a physical model of the system for the predicting.

3. The method of claim 1, wherein the system is one or more CSTR systems connected in series.

4. The method of claim 1, further including calibrating the one or more CSTR surrogate models by iteratively adjusting one or more of the features and parameters of the PCA operation according to the input data received from the AD model.

5. A system for intelligent forecasting of material concentrations in a fluid within a computing environment, comprising:
   one or more computers with executable instructions that when executed cause the system to:
      receive and process input data from an advection-diffusion (AD) model of a fluid;
      select one or more features and parameters from historical flow data of a material in the fluid as input for a principle component analysis (PCA) operation of a system, wherein the historical flow data is part of the input data received from the AD model;
      perform the PCA operation according to the one or more features and parameters selected as input, wherein the PCA operation includes:

utilizing the one or more features and parameters to determine a maximum number of principal components (PCs), a maximum number of continuous stirred tank reactor (CSTR) systems per each one of the PCs, and criteria for convergence, and performing a transformation operation to convert material flow trajectories of the AD model into each one of the PCs;

generate one or more CSTR surrogate models according to an output of the PCA operation, wherein the PCs of the PCA operation define one or more input parameters for the CSTR surrogate models; and predict a material concentration of the material in the fluid according to an analyzation of the one or more continuous CSTR surrogate models on statistical flow trajectories of the fluid defined by the PCA operation of the system.

6. The system of claim 5, wherein the executable instructions further parameterize the one or more CSTR surrogate models using the PCA operation of a physical model of the system for the predicting.

7. The system of claim 5, wherein the system is one or more CSTR systems connected in series.

8. The system of claim 5, wherein the executable instructions further calibrate the one or more CSTR surrogate models by iteratively adjusting one or more of the features and parameters of the PCA operation according to the input data received from the AD model.

9. A computer program product for, by a processor, intelligent forecasting of material concentrations in a fluid, the computer program product comprising a non-transitory computer-readable storage medium having computer-readable program code portions stored therein, the computer-readable program code portions comprising:

an executable portion that receives and processes input data from an advection-diffusion (AD) model of a fluid;

an executable portion that selects one or more features and parameters from historical flow data of a material in the fluid as input for a principle component analysis (PCA) operation of a system, wherein the historical flow data is part of the input data received from the AD model;

an executable portion that performs the PCA operation according to the one or more features and parameters selected as input, wherein the PCA operation includes:

utilizing the one or more features and parameters to determine a maximum number of principal components (PCs), a maximum number of continuous stirred tank reactor (CSTR) systems per each one of the PCs, and criteria for convergence, and performing a transformation operation to convert material flow trajectories of the AD model into each one of the PCs;

an executable portion that generates one or more CSTR surrogate models according to an output of the PCA operation, wherein the PCs of the PCA operation define one or more input parameters for the CSTR surrogate models; and an executable portion that predicts a material concentration of the material in the fluid according to an analyzation of the one or more continuous CSTR surrogate models on statistical flow trajectories of the fluid defined by the PCA operation of the system.

10. The computer program product of claim 9, further including an executable portion that parameterizes the one or more CSTR surrogate models using the PCA operation of a physical model of the system for the predicting.

11. The computer program product of claim 9, wherein the system is one or more CSTR systems connected in series.

12. The computer program product of claim 9, further including an executable portion that calibrates the one or more CSTR surrogate models by iteratively adjusting one or more of the features and parameters of the PCA operation according to the input data received from the AD model.

* * * * *